US011589561B2

(12) United States Patent
Goh

(10) Patent No.: US 11,589,561 B2
(45) Date of Patent: Feb. 28, 2023

(54) AQUATIC FARMING IN INTERMODAL CONTAINERS

(71) Applicant: Temasek Life Sciences Laboratory Limited, Singapore (SG)

(72) Inventor: Chin Heng Goh, Singapore (SG)

(73) Assignee: Temasek Life Sciences Laboratory Limited, Singapore (SG)

( * ) Notice: Subject to any disclaimer, the term of this patent is extended or adjusted under 35 U.S.C. 154(b) by 0 days.

(21) Appl. No.: 16/972,244

(22) PCT Filed: Jun. 3, 2019

(86) PCT No.: PCT/SG2019/050286
§ 371 (c)(1),
(2) Date: Dec. 4, 2020

(87) PCT Pub. No.: WO2019/236006
PCT Pub. Date: Dec. 12, 2019

(65) Prior Publication Data
US 2021/0227800 A1   Jul. 29, 2021

(30) Foreign Application Priority Data

Jun. 4, 2018   (SG) .................... 10201804724U

(51) Int. Cl.
*A01K 61/10* (2017.01)
*A01K 63/04* (2006.01)

(52) U.S. Cl.
CPC .............. *A01K 61/10* (2017.01); *A01K 63/04* (2013.01)

(58) Field of Classification Search
CPC ........ A01K 61/00; A01K 63/04; A01K 61/13; A01K 61/17; A01K 61/20; A01K 61/30;
(Continued)

(56) References Cited

U.S. PATENT DOCUMENTS

| 4,593,498 A | 6/1986 | Stauss et al. |
| 6,098,696 A | 8/2000 | Styra |

(Continued)

FOREIGN PATENT DOCUMENTS

| CN | 105379666 A | 3/2016 |
| CN | 105393959 A | 3/2016 |

(Continued)

OTHER PUBLICATIONS

International Search Report and Written Opinion dated Jul. 19, 2019 in PCT/SG2019/050286, 9 pages.

*Primary Examiner* — Joshua J Michener
*Assistant Examiner* — Henry Hooper Mudd
(74) *Attorney, Agent, or Firm* — Stinson LLP

(57) ABSTRACT

The present invention generally relates to an aquatic farming system (200) comprising one or more stacked levels of an array of one or more aquatic farming modules (100). Each aquatic farming module (100) comprises an intermodal container (102) comprising a pair of opposing side walls (104) and a pair of opposing end entrances (106), and a housing structure (110) disposed in the intermodal container (102) and extending between the side walls (104) thereof. The aquatic farming module (100) further comprises a set of access doors (130) disposed at one or both end entrances (106) of the intermodal container (100), the access doors (130) actuatable planarly for selectively opening/closing the respective end entrances (106). Selective opening/closing of the end entrances (106) of the intermodal containers (102) in each stacked level facilitates user accessibility to the housing structures (110) in said stacked level for farming aquatic organisms.

18 Claims, 6 Drawing Sheets

(58) Field of Classification Search
CPC ........ A01K 61/40; A01K 61/50; A01K 61/51;
A01K 61/53; A01K 61/54; A01K 61/56;
A01K 61/59; A01K 63/00; A01K 63/003;
A01K 63/02; Y02A 40/81
See application file for complete search history.

(56) References Cited

U.S. PATENT DOCUMENTS

| | | | |
|---|---|---|---|
| 11,206,817 B2* | 12/2021 | Kemp | A01K 61/59 |
| 2004/0149233 A1* | 8/2004 | Cummins | A01K 63/04 |
| | | | 119/227 |
| 2006/0207193 A1 | 9/2006 | Lilke | |
| 2011/0290191 A1 | 12/2011 | Boer et al. | |
| 2012/0309081 A1* | 12/2012 | Herzog | C12M 1/42 |
| | | | 435/288.7 |
| 2017/0013810 A1* | 1/2017 | Grabell | A01K 63/00 |
| 2019/0168092 A1* | 6/2019 | Beaver | A63B 69/00 |

FOREIGN PATENT DOCUMENTS

| | | |
|---|---|---|
| CN | 107531406 A | 1/2018 |
| KR | 1020180002549 | 1/2018 |
| WO | 2011002255 A2 | 1/2011 |

\* cited by examiner

AQUATIC FARMING IN INTERMODAL CONTAINERS

CROSS REFERENCE TO RELATED APPLICATION(S)

The present application is the 371 National Stage Application of International Patent Application Serial No. PCT/SG2019/050286, filed 3 Jun. 2019, which claims the benefit of Singapore Patent Application No. 10201804724U filed on 4 Jun. 2018, the entire disclosures of which are incorporated herein by reference.

TECHNICAL FIELD

The present invention generally relates to aquatic farming. More particularly, the present invention describes various embodiments of an aquatic farming system having aquatic farming modules and intermodal containers in stacked levels for farming aquatic organisms.

BACKGROUND

Fisheries around the world are facing declining amounts of wild fish stocks, resulting in less fish being harvested from the oceans. Many rivers and seas are being polluted with industrial and agricultural waste, and this has led to toxic algal blooms that have killed fishes being grown for food. Toxic or harmful algal blooms are organisms that can severely lower oxygen levels and release toxins into natural waters, and kill marine life. Rising sea temperatures further exacerbate the situation, limiting aquaculture production or aquatic farming to meet ever increasing human population. Urbanization is also taking away traditional farming land for industrialization and housing purposes. This has a significant negative impact on countries that have a small land area and at the same time an increasing population. This means that aquatic farming must be conducted on a small land area and at increasing densities to produce enough aquatic organisms for consumption.

Various methods have been used to grow fish in tanks on land. Many of these tanks are built by casting in heavy cement and require expensive structural support. They are also purpose-built for specific locations and cannot be easily relocated. As these tanks are permanently located on land, they require large amounts of water for daily changes to maintain good water conditions for fish grown in the tanks.

U.S. Pat. No. 9,089,113 describes a food production system housed in one or more intermodal shipping containers. Multiple containers can be stacked vertically, end-to-end, or side-to-side. Each container may be provided with one or more access doors. However, the doors merely permit user accessibility to the respective container and hinder user accessibility to other containers that are stacked together.

Therefore, in order to address or alleviate at least one of the aforementioned problems and/or disadvantages, there is a need to provide an improved aquatic farming system.

SUMMARY

According to an aspect of the present invention, there is an aquatic farming system comprising a set of aquatic farming modules arranged in one or more stacked levels, each stacked level comprising an array of one or more aquatic farming modules. Each aquatic farming module comprises an intermodal container comprising a pair of opposing side walls and a pair of opposing end entrances, and a housing structure disposed in the intermodal container and extending between the side walls thereof. The housing structure comprises a first compartment for storing water and aquatic organisms, and a second compartment adjacent to the first compartment for installing a set of water treatment mechanisms to treat the water in the first compartment. The aquatic farming module further comprises a set of access doors disposed at one or both end entrances of the intermodal container, the access doors actuatable planarly for selectively opening/closing the respective end entrances. For each stacked level of aquatic farming modules, selective opening/closing of the end entrances of the intermodal containers in said stacked level facilitates user accessibility to the housing structures in said stacked level for farming the aquatic organisms.

In some embodiments, each access door comprises a roller shutter coupled to an upper portion of the respective end entrance, the roller shutter actuatable vertically at the respective end entrance. In one embodiment, each aquatic farming module may further comprise one or more external access platforms integrally formed with or permanently attached to the housing structure or intermodal container. Each external access platform may be attached to the housing structure or intermodal container by a hinge component such that the external access platform is rotatable about a lateral hinge axis. In another embodiment, each aquatic farming module may further comprise one or more external access platforms coupleable to bottom portions of the end entrances of the intermodal container.

In some embodiments, each housing structure further comprises multiple structural elements forming the first and second compartments. The structural elements in each housing structure may comprise a first longitudinal panel adjacent to one side wall of the intermodal container and bounding the first compartment, and a second longitudinal panel adjacent to the other side wall of the intermodal container and bounding the second compartment. The structural elements in each housing structure may further comprise a third longitudinal panel interposing the first and second longitudinal panels to separate the first and second compartments.

In some embodiments, the structural elements in each housing structure further comprise one or more first partition panels dividing the first compartment into a plurality of first sub-compartments for storing a plurality of groups of aquatic organisms. The first partition panels may be removably installed in the first compartment for selectively dividing the first compartment into the first sub-compartments. The structural elements in each housing structure may further comprise one or more second partition panels dividing the second compartment into a plurality of second sub-compartments for installing the water treatment mechanisms. Each second partition panel may comprise an opening for connecting the water treatment mechanisms to one another.

In some embodiments, the structural elements in each housing structure comprise a platform panel disposed on the second compartment to facilitate user accessibility through the intermodal container. The structural elements in each housing structure may be welded to one another. The structural elements may comprise a polyethylene or polypropylene material.

In some embodiments, each aquatic farming module further comprises a protective layer lining interior surfaces of the intermodal container. The protective layer may comprise a corrosion-resistant material, such as epoxy or polyurethane.

In some embodiments, the aquatic farming system further comprises a set of external systems connectable to the housing structures via the end entrances of the intermodal containers. The aquatic farming system may further comprise a set of external modules arranged with the aquatic farming modules for housing the external systems. The external systems may comprise a water recycling system and/or waste recycling system.

An advantage of the present invention is that multiple aquatic farming modules can be arranged together in arrays and stacked levels to reduce spatial footprint. The modular configuration of the aquatic farming system allows each aquatic farming module to be easily replaced and the aquatic farming system to be relocated. Multiple aquatic farming modules provides greater capacity to farm large amounts of aquatic organisms, thereby increasing food production for people.

An aquatic farming system according to the present invention is thus disclosed herein. Various features, aspects, and advantages of the present invention will become more apparent from the following detailed description of the embodiments of the present invention, by way of non-limiting examples only, along with the accompanying drawings.

DETAILED DESCRIPTION

In the present invention, depiction of a given element or consideration or use of a particular element number in a particular figure or a reference thereto in corresponding descriptive material can encompass the same, an equivalent, or an analogous element or element number identified in another figure or descriptive material associated therewith. The use of "/" in a figure or associated text is understood to mean "and/or" unless otherwise indicated.

As used herein, the terms "comprising", "including", "having", and the like do not exclude the presence of other components/elements/features than those listed in an embodiment. Recitation of certain components/elements/features in mutually different embodiments does not indicate that a combination of these components/elements/features cannot be used in an embodiment.

As used herein, the terms "a" and "an" are defined as one or more than one. The term "set" corresponds to or is defined as a non-empty finite organization of elements that mathematically exhibits a cardinality of at least one (e.g. a set as defined herein can correspond to a unit, singlet, or single element set, or a multiple element set), in accordance with known mathematical definitions. The recitation of a particular numerical value or value range herein is understood to include or be a recitation of an approximate numerical value or value range.

For purposes of brevity and clarity, descriptions of embodiments of the present invention are directed to an aquatic farming system in accordance with the drawings. While aspects of the present invention will be described in conjunction with the embodiments provided herein, it will be understood that they are not intended to limit the present invention to these embodiments. On the contrary, the present invention is intended to cover alternatives, modifications and equivalents to the embodiments described herein, which are included within the scope of the present invention as defined by the appended claims. Furthermore, in the following detailed description, specific details are set forth in order to provide a thorough understanding of the present invention. However, it will be recognized by an individual having ordinary skill in the art, i.e. a skilled person, that the present invention may be practiced without specific details, and/or with multiple details arising from combinations of aspects of particular embodiments. In a number of instances, known systems, methods, procedures, and components have not been described in detail so as to not unnecessarily obscure aspects of the embodiments of the present invention.

Figure 1:
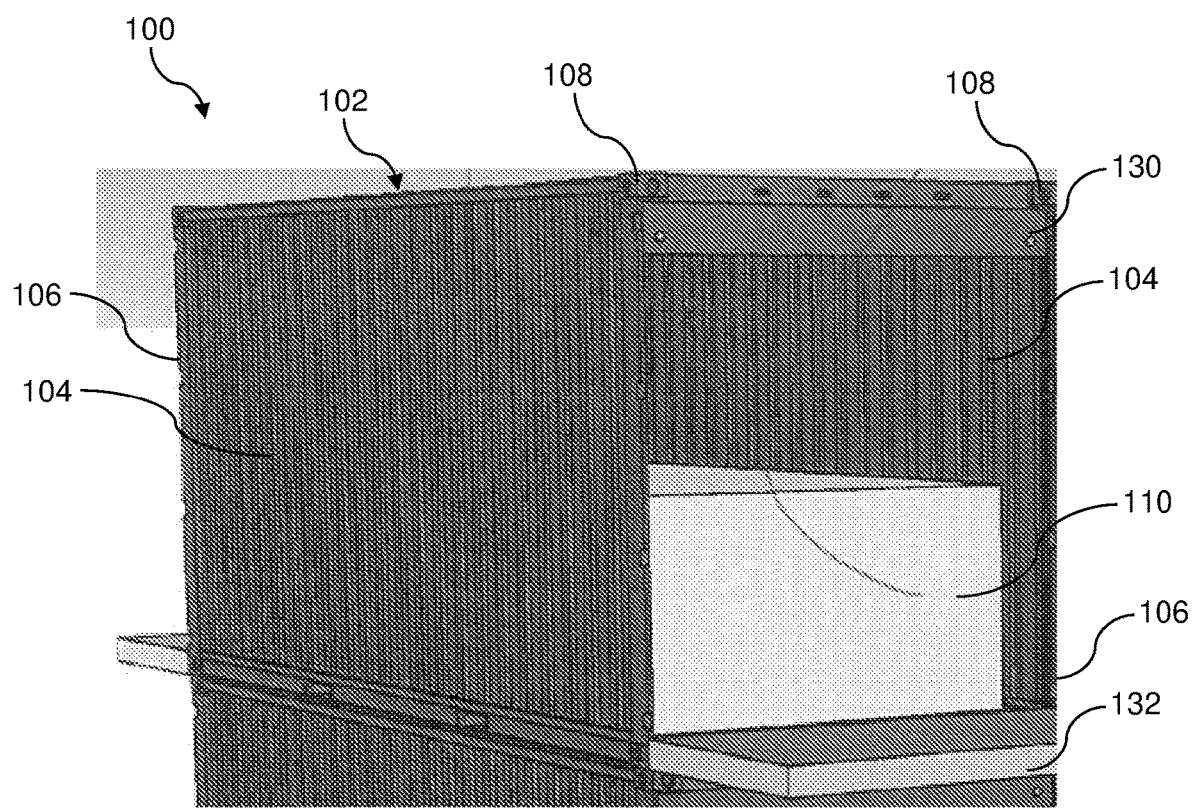
FIG. 1 is an illustration of a perspective view of an aquatic farming module, in accordance with various embodiments of the present invention.

In various representative or exemplary embodiments of the present invention with reference to FIG. 1, there is an aquatic farming module or unit 100 for farming aquatic organisms including aquatic plants and animals. For example, the aquatic farming module 100 is configured for farming aquatic animals such as fish, crustaceans, and other aquatic species.

The aquatic farming module 100 comprises an intermodal container 102. The intermodal container 102 is a large standardized shipping container for intermodal freight transport and may also be referred to as a freight container or ISO container. The intermodal container 102 may be of various standardized sizes, such as 20-foot or 40-foot. For example, a 20-foot intermodal container has an approximate length of 6 meters, an approximate width of 2.4 meters, and an approximate height of 2.6 meters. A 40-foot intermodal container is twice the length of the 20-foot version but with the same width and height. Other standardized sizes may be used depending on the interior space required for the aquatic farming module 100, such as 40-foot high-cube or 45-foot high-cube.

The intermodal container 102 comprises a pair of opposing side walls 104 extending longitudinally along the length of the intermodal container 102. The intermodal container 102 further comprises a pair of opposing end entrances 106 extending laterally along the width of the intermodal container 102. The end entrances 106 are selectively openable/closeable to facilitate user accessibility into the intermodal container 102. Users of the aquatic farming module 100 may comprise working personnel, e.g. operators and maintenance staff, and visitors from the general public who wants to see how aquatic organisms are farmed from the aquatic farming module 100.

The intermodal container 102 is made of corrugated sheet metal with a galvanized iron or mild steel material. The intermodal container 102 further comprises eight corner castings 108 positioned at the eight corners of the intermodal container 102. The corner castings 108 provide lifting and securing points for the intermodal container 102, such as for transportation. Further, the corner castings 108 allow the intermodal container 102 to be connected to other intermodal containers 102 side-by-side or end-to-end. Yet further, the corner castings 108 are configured to withstand stacking loads when multiple intermodal containers 102 are stacked vertically. The corner castings 108 may be made from a steel material that is casted or forged.

In some embodiments, the aquatic farming module 100 further comprises a protective layer lining interior surfaces of the intermodal container 102. As the intermodal container 102 is made of galvanized iron or mild steel material which is prone to corrosion/rust, the protective layer protects the interior surfaces of the intermodal container 102 from corrosion/rusting and mitigates the risk of the aquatic organisms being contaminated by corrosive substances/rust. The aquatic farming module 100 may be used in a seawater environment, such as on ships or barges, and seawater or saltwater tends to facilitate corrosion. The protective layer may comprise a corrosion-resistant or anti-corrosion material such as epoxy or polyurethane.

The aquatic farming module 100 further comprises a housing structure 110 disposed in the intermodal container 102 and extending between the side walls 104 of the intermodal container 102. In one embodiment, the housing structure 110 abuts and adheres to the side walls 104. In another embodiment, the housing structure 110 partially abuts the side walls 104 without adhering thereto. In yet another embodiment, the housing structure 110 is adjacent to, but without abutting/adhering, the side walls 104, such that small spaces are formed between the housing structure 110 and the side walls 104. The small spaces allow for thermal expansion and contraction of the intermodal container 102 and housing structure 110 when the aquatic farming module 100 is subjected to different environmental conditions. Disposing the housing structure 110 close to the side walls 104 maximizes the available space in the housing structure 110 so that more aquatic organisms can be farmed.

Figure 2:
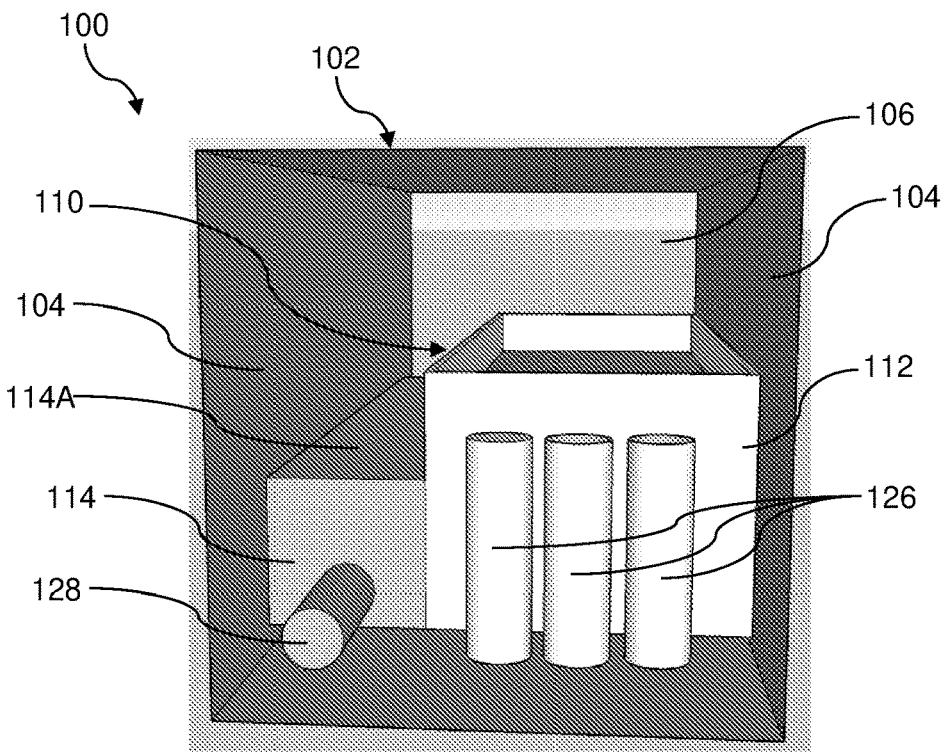
FIG. 2 is an illustration of a perspective view of an interior of the aquatic farming module, in accordance with various embodiments of the present invention.
Figure 3:
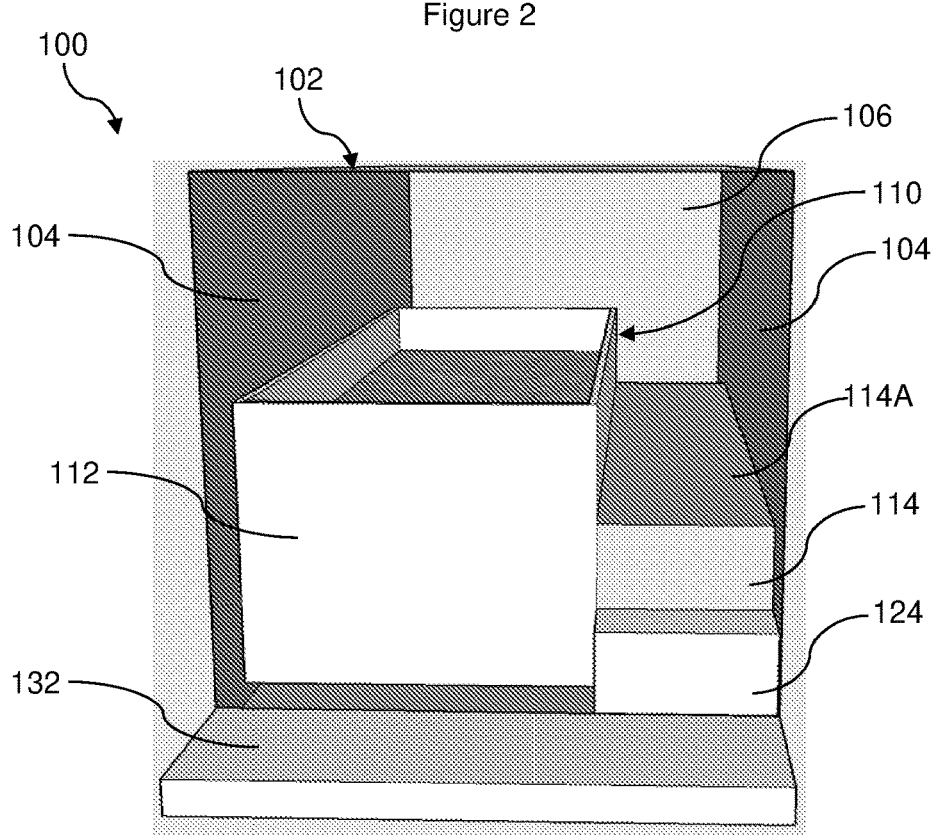
FIG. 3 is an illustration of an opposite perspective view of the interior of the aquatic farming module, in accordance with various embodiments of the present invention.

Further with reference to FIG. 2 and FIG. 3, the housing structure 110 comprises a first compartment 112 for storing water and aquatic organisms. The housing structure 110 further comprises a second compartment 114 adjacent to the first compartment 112 for installing a set of water treatment mechanisms to treat the water in the first compartment 112. The housing structure 110 further comprises multiple structural elements forming the first compartment 112 and second compartment 114. Alternatively, the first compartment 112 and second compartment 114 may be formed as an integrated structure or formed integrally with the intermodal container 102. The structural elements comprise a floor panel forming the base of the housing structure 110, including that of the first compartment 112 and second compartment 114. The floor panel distributes the weight or load of the first compartment 112 and second compartment 114 over the floor/base of the intermodal container 102. The housing structure 110 may be fastened or secured to the floor/base of the intermodal container 102.

Figure 4:
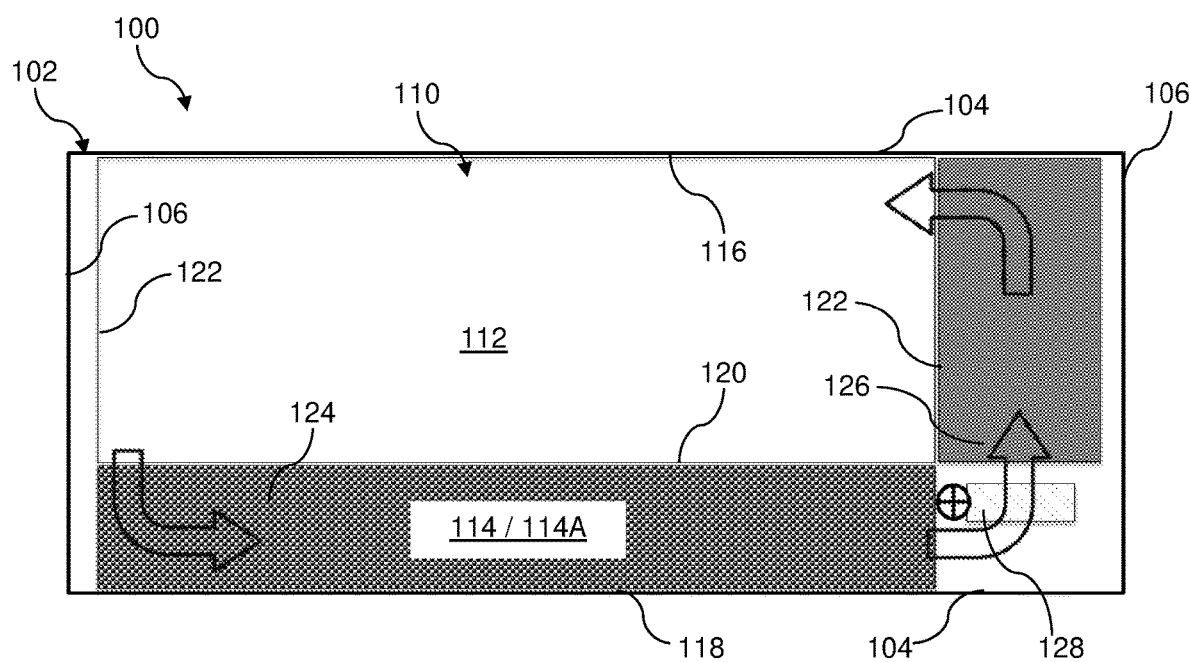
FIG. 4 is an illustration of a top planar view of the interior of the aquatic farming module, in accordance with various embodiments of the present invention.
Figure 5:
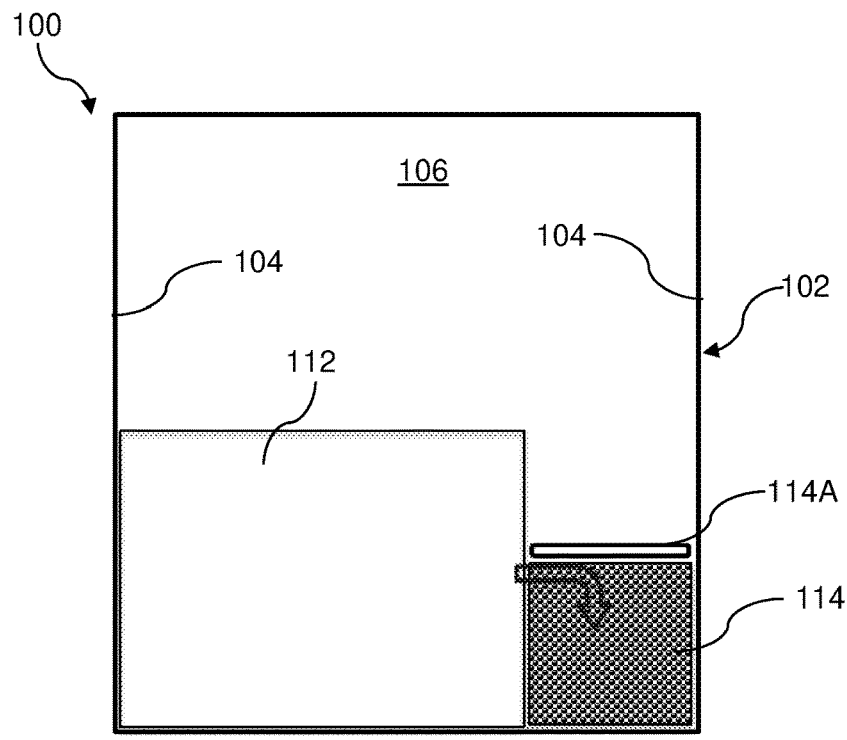
FIG. 5 is an illustration of an end view of the interior of the aquatic farming module, in accordance with various embodiments of the present invention.
Figure 6:
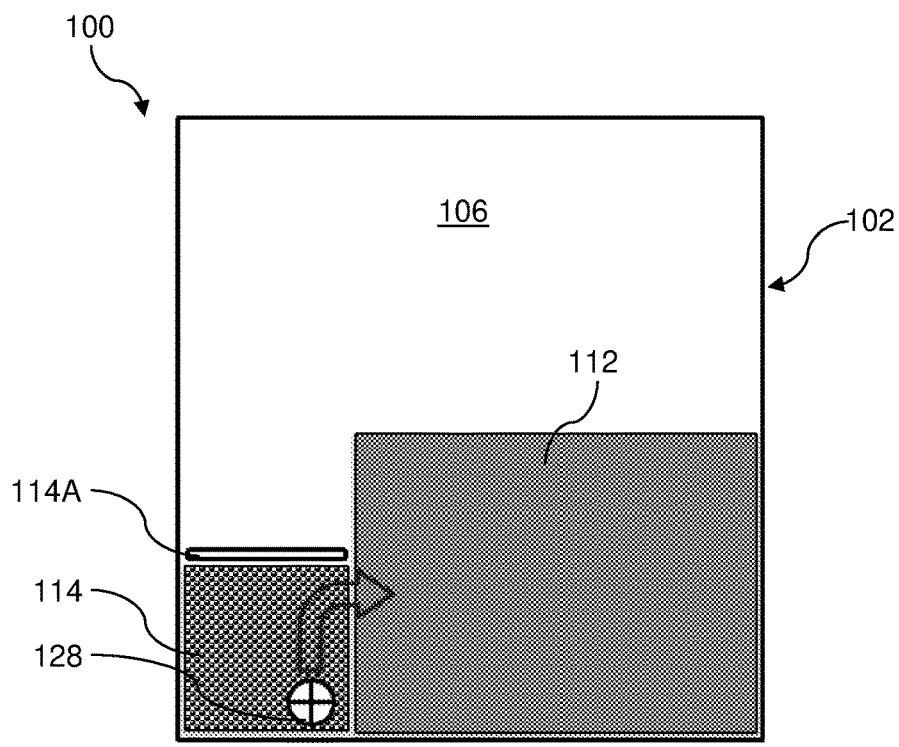
FIG. 6 is an illustration of an opposite end view of the interior of the aquatic farming module, in accordance with various embodiments of the present invention.

Further with reference to FIG. 4 to FIG. 6, the structural elements further comprise a first longitudinal panel 116 adjacent to one side wall 104 of the intermodal container 102 and bounding the first compartment 112, and a second longitudinal panel 118 adjacent to the other side wall 104 of the intermodal container 102 and bounding the second compartment 114. In one embodiment, the first longitudinal panel 116 and second longitudinal panel 118 are attached to the respective side walls 104, such as by an adhesive. In another embodiment, the first longitudinal panel 116 and second longitudinal panel 118 partially abuts the respective side walls 104 without adhering thereto. In yet another embodiment, the first longitudinal panel 116 and second longitudinal panel 118 are adjacent to, but without abutting, the respective side walls 104. Small spaces are thus formed between the side walls 104 and the first longitudinal panel 116 and second longitudinal panel 118 to allow for thermal expansion and contraction in different environmental conditions. Disposing the first longitudinal panel 116 and second longitudinal panel 118 adjacent close to the respective side walls 104 maximizes the available space in the first compartment 112 and second compartment 114 so that more aquatic organisms can be farmed.

The structural elements further comprise a third longitudinal panel 120 interposing the first longitudinal panel 116 and second longitudinal panel 118 to separate the first compartment 112 and second compartment 114. The structural elements further comprise some lateral panels 122 bounding the first compartment 112. Particularly, the first compartment 112 is bounded by the first longitudinal panel 116, third longitudinal panel 120, and lateral panels 122. In one embodiment, the lateral panels 122 also bound the second compartment 114 such that the second compartment 114 forms an L-shaped profile adjacent to the first compartment 112, as shown in FIG. 4. One or more of the lateral panels 122 may be reinforced, such as with structural bracings, as the lateral panels 122 are not positioned adjacent to a structural component of the intermodal container 102, unlike the first longitudinal panel 116 and second longitudinal panel 118 which are positioned adjacent to the side walls 104. The braced lateral panels 122 improve the structural integrity and reduce bulging of the first compartment 112 and second compartment 114, especially when a large amount of water is stored in the first compartment 112 which can exert stronger loads on the lateral panels 122.

In some embodiments, the structural elements further comprise one or more first partition panels dividing the first compartment 112 into a plurality of first sub-compartments for storing a plurality of groups of aquatic organisms. For example, one first sub-compartment is configured for storing fishes and another first sub-compartment is configured for storing crustaceans such as prawns and shrimps. In one embodiment, the first partition panels are permanently installed in the first compartment 112, such as by welding or adhesive. In another embodiment, the first partition panels are removably installed in the first compartment 112 for selectively dividing the first compartment 112 into the first sub-compartments. Appropriate structural elements, such as grooves or receptacles, may be provided to receive and install the first partition panels. The first partition panels may be installable at different parts of the first compartment 112 to control the volumes of the first sub-compartments. For example, smaller aquatic organisms such as shrimps can be stored in a smaller first sub-compartment, while larger aquatic organisms such as fishes can be stored in a larger first sub-compartment.

In some embodiments, the structural elements further comprise one or more second partition panels dividing the second compartment 114 into a plurality of second sub-compartments for installing the water treatment mechanisms. Specifically, each second sub-compartment is configured for installing one or more of the water treatment mechanisms. In one embodiment, the second partition panels are permanently installed in the second compartment 114, such as by welding or adhesive. In another embodiment, the second partition panels are removably installed in the second compartment 114 for selectively dividing the second compartment 114 into the second sub-compartments. Appropriate structural elements, such as grooves or receptacles, may be provided to receive and install the second partition panels. The second partition panels may be installable at different parts of the second compartment 114 to control the volumes of the second sub-compartments based on the sizes of the water treatment mechanisms to be installed.

Each second partition panel optionally comprises an opening for connecting the water treatment mechanisms to one another, such as by fluid communication channels through the openings for water communication across the water treatment mechanisms. The structural elements may further comprise a platform panel 114A disposed on the second compartment 114 to facilitate user accessibility through the intermodal container 102. The platform panel 114A provides a working platform that allows users, e.g. working personnel, to walk on and go across the intermodal container 102, such as to access the first compartment 112 for introducing/removing aquatic organisms and monitoring the habitat conditions for the aquatic organisms. In one embodiment, the platform panel 114A has an approximate length of 4.5 meters and an approximate width of 0.8 meters, and is at an approximate height of 0.7 meters, the dimensions corresponding to that of the second compartment 114. At this height, the platform panel 114A can provide the users with sufficient height/ceiling space to comfortably walk across the intermodal container 102, given that the height of the intermodal container 102 is approximately 2.6 meters. The platform panel 114A may comprise a grated structure made of a corrosion-resistant material, such as a steel grating. Optionally, the platform panel 114A is lined a corrugated/textured/non-slip surface.

In some embodiments, the structural elements in the housing structure 110 are permanently attached or fixed to one another, such as by welding or adhesive. In some other embodiments, the structural elements are removably attached or fastened to one another, such as by mechanical fasteners or other known coupling mechanisms. Each structural element is appropriately dimensioned, such as panel thicknesses, depending on the loading conditions for the housing structure 110. The housing structure 110, or more specifically the structural elements thereof, comprises a material that is safe for aquatic organisms and/or that is corrosion-resistant as the aquatic farming module 100 may be used in a seawater environment. Some non-limiting examples of the aquatic-safe material include polyethylene, polypropylene, acrylic, glass, polycarbonate, and fiberglass. Preferably, the aquatic-safe material is high-density polyethylene (HDPE).

As stated above, the first compartment 112 is configured for storing water and aquatic organisms. The water may be freshwater or seawater depending on the species of aquatic organisms. The aquatic organisms may be fishes and crustaceans, such as prawns and shrimps, that can be bred or farmed for food production. The first compartment 112 may also be referred to as an aquaculture/aquafarming compartment or tank. The top portion of the first compartment 112 may be open or uncovered, allowing for easier monitoring of the habitat conditions for the aquatic organisms and the quality of water, as well as for easier monitoring and harvesting of the aquatic organisms. The top portion of the first compartment 112 may optionally be covered, such as by a netting, to prevent the aquatic organisms from jumping out of the water and/or control illumination in the water. In one embodiment, the first compartment 112 has an approximate length of 4.5 meters, an approximate width of 1.5 meters, and of sufficient height to store an approximate water height of 1 meter.

As stated above, the second compartment 114 is configured for installing a set of water treatment mechanisms to treat the water in the first compartment 112. In one embodiment, the second compartment 114 has an approximate length of 4.5 meters, an approximate width of 0.8 meters, and an approximate height of 0.7 meters. A recirculating aquaculture system (RAS) is known to be used for treating water to maintain a healthy environment for aquatic organisms, such as in home-based aquaria. The RAS retains, treats, and reuses the water within the system. For example, the water in the RAS flows from a fish tank through a treatment process and is then returned to the tank. The RAS has components, such as filtration mechanisms, that treat the water by decomposing organic waste matter biologically and removing the waste matter mechanically. Usually, when the waste matter is removed from the water, some of the water is also removed from the RAS, resulting in some water loss. The RAS reduces ammonia toxicity in the water, maintains clean water, and provides a suitable habitat for fishes.

In some embodiments, the water treatment mechanisms installed in the second compartment 114 constitute a RAS that treats the water according to a series of treatment processes to maintain desired water quality and provide a suitable habitat/environment for the aquatic organisms. Although some water is loss through the treatment processes, the water loss is usually minimal at around 2% of the amount in the RAS per day. This is achievable by using high surface area biological growth media and high efficiency nitrifying bacteria strains. The water treatment mechanisms comprise a water monitoring and control device to monitor the water quality and the habitat/environment conditions for the aquatic organisms. The treatment processes include, but are not limited to, biological, mechanical, chemical, disinfection, aeration, and temperature treatment processes.

In one embodiment as shown in FIG. 2 to FIG. 4, the water treatment mechanisms further comprise a biological treatment mechanism 124 located in the portion of the second compartment 114 adjacent to the side wall 104. The water treatment mechanisms further comprise other treatment mechanisms for the mechanical, chemical, disinfection, aeration, and temperature treatment processes. The other treatment mechanisms are collectively referred to as non-biological treatment mechanisms 126 and are located in the portion of the second compartment adjacent to the end entrance 106. The water treatment mechanisms further comprise a water pump 128 located between the biological treatment mechanism 124 and the non-biological treatment mechanisms 126. The water pump 128 controls water communication or flow from the biological treatment mechanism 124 towards the non-biological treatment mechanisms 126, thereby recirculating the water in the first compartment 112 in an anticlockwise direction as shown by arrows in FIG. 4 to FIG. 6. In another embodiment two or more parallel water pumps maybe used for fault tolerance or redundancy in case one of the water pumps fail or becomes faulty during operation. The water treatment mechanisms further comprise channels, pipes, and/or valves to control water communication across the water treatment mechanisms. It will be appreciated that the water treatment mechanisms may be positioned differently to rearrange the treatment processes and/or to recirculate the water differently, such as in a clockwise direction instead.

In one embodiment, the water pump 128 pumps and discharges waste water from the first compartment 112 to the biological treatment mechanism 124 for performing the biological treatment process. The biological treatment mechanism 124 comprises a screen mesh that filters and removes large particles in the waste water such as uneaten food and solid waste matter. The biological treatment mechanism 124 then treats the waste water by converting toxic ammonia in the water, which is excreted by aquatic organisms such as fishes, into nitrate which is less toxic. Certain communities or strains of bacteria may be used in the biological treatment mechanism 124 to nitrify the ammonia. Partial denitrification occurs in anoxic regions within the biological treatment mechanism 124 where nitrate is further processed to nitrogen gas and released to the environment. The biological treatment mechanism 124 may be configured to perform the aeration treatment process to aerate the water with air to thereby remove dissolved carbon dioxide and to dissolve oxygen to reoxygenate the water. Fresh oxygen is required by the aquatic organisms to metabolize food and grow, and also by the bacteria communities in the biological treatment mechanism 126. Optionally, if seawater is stored in and discharged from the first compartment 112, a foam fractionator is included in the biological treatment mechanism 124 to remove foamable organic matter from the water.

The water pump 128 then pumps the biologically-treated water from the biological treatment mechanism 124 to the non-biological treatment mechanisms 126 for performing the other treatment processes. In the mechanical treatment process, the non-biological treatment mechanisms 126 comprise mechanical filters for removing particulate matter from the water. The mechanical filters may remove particulate matter as small as 25 microns. The mechanical filters may comprise sand filters, particle filters, and/or drum filters. Optionally, in the chemical treatment process, the non-biological treatment mechanisms 126 monitor and control the pH or acidity/alkalinity of the water. For example, nitrification of the ammonia in the biological treatment mechanism 124 reduces the pH of the water, making the water more acidic. Keeping the pH in a suitable range, such as 5.0 to 9.0 for freshwater, maintains the health of aquatic organisms as well as the biological treatment mechanism 124. The acidity/alkalinity of the water may be controlled by adding sodium hydroxide or hydrogen bicarbonate or other suitable buffers. In the disinfection treatment process, the non-biological treatment mechanisms 126 uses ultraviolet radiation and/or ozone treatment to reduce bacteria and/or viruses in the biologically-treated, mechanically-treated, and optionally chemically-treated water, thereby disinfecting the water.

The non-biological treatment mechanisms 126 may be configured to perform another aeration treatment process. Optionally, in the temperature treatment process, the non-biological treatment mechanisms 126 comprise a heating mechanism to control the temperature of the water. The heating mechanism may comprise a submerged heater, heat pump, chiller, and/or heat exchanger. The temperature treatment process maintains an optimal temperature for farming the aquatic organisms, such as to maximize fish production. It will be appreciated that the treatment processes may be performed in different sequences or in tandem with one another. The water pump 128 returns the treated water to the first compartment 112 as shown in FIG. 6. Optionally, the first compartment 112 is installed with a number of in-tank air diffusers to sufficiently aerate the water stored in the first compartment 112 for aquatic organisms to live and grow.

The aquatic farming module 100 further comprises a set of access doors 130 disposed at one or both end entrances 106 of the intermodal container 102. The access doors 130 are actuatable planarly, i.e. parallel to the plane of the end entrances 106, for selectively opening and/or closing the respective end entrances 106. Selective opening/closing of the end entrances 106 of the intermodal container 102 facilitates user accessibility to the housing structure 110 for farming the aquatic organisms. In one embodiment, the access doors 130 are manually operated. In another embodiment, the access doors 130 are connected to an access control system that automates actuation of the access doors 130, such as by motorized mechanisms. The access control system may provide an override function that allows the access doors 130 to be manually operated.

In one example, both access doors 130 are actuated to close the end entrances 106 and are optionally locked to prevent user accessibility to the housing structure 110, such as to provide a controlled environment/habitat for the aquatic organisms and/or to prevent unauthorized access into the intermodal container 102. In another example, one or both access doors 130 are actuated to open the end entrances 106 to expose the housing structure 110 and aquatic organisms to an ambient environment. The one or both open end entrances 106 allow for free movement into and out of the intermodal container 102, such as by users who wants to monitor the habitat conditions for the aquatic organisms as well as the quality of water in the first compartment 112.

In one embodiment, one or both access doors 130 comprise a roller shutter coupled to an upper portion of the respective end entrance 106. The roller shutter is actuatable vertically downwards at the respective end entrance 106 parallel to the plane thereof to selectively open/close the respective end entrance 106. The roller shutter may also be referred to as a roller door or sectional overhead door. In another embodiment, one or both access doors 130 comprise a folding door coupled to side edges of the respective end entrance 106. The folding door is actuatable laterally at the respective end entrance 106 parallel to the plane thereof (leftwards and/or rightwards) to selectively open/close the respective end entrance 106. The folding door comprises multiple door panels that are slideable so that the door panels can be compacted together.

In some embodiments, the aquatic farming module 100 further comprises one or more external access platforms 132 integrally formed with or permanently attached to the housing structure 110 or the intermodal container 102. The external access platforms 132 extend longitudinally outside of the end entrances 106 of the intermodal container 102. In one embodiment, each external access platform 132 is attached to the housing structure 110/intermodal container 102 by a hinge component such that the external access platform 132 is rotatable about a lateral hinge axis.

In some embodiments, the aquatic farming module 100 further comprises one or more external access platforms 132 coupleable to bottom portions of the end entrances 106 of the intermodal container 102. In one embodiment, the aquatic farming module 100 comprises a pair of external access platforms 132 stored in the intermodal container 102. The external access platforms 132 can be removably coupled to the respective pairs of bottom corner castings 108 at the respective end entrances 106. Each external access platform 132 comprises appropriate attachments/coupling mechanisms for removably coupling to the respective pair of bottom corner castings 108. The external access platforms 132 may be made of a lightweight material with sufficient structural integrity, such that they can be easily coupled and can withstand the weight of users walking on the external access platforms 132 to enter/exit the intermodal container 102. In one embodiment, each external access platform 132 has an approximate length of 1.2 meters and an approximate width of 2.4 meters. The external access platforms 132 may be made of galvanized iron or mild steel material with corrosion-resistant coating.

In some embodiments, the aquatic farming module 100 further comprises one or more external access ladders coupleable to the top and bottom portions of the entrances 106 of the intermodal container 102, and/or coupleable to the edges of the external access platforms 130. The external access ladders and end entrances 106/external access platforms 132 comprise appropriate attachments/coupling mechanisms for removably coupling the external access ladders to the end entrances 106/external access platforms 132. The external access ladders may be used by working personnel to access the upper portion of the aquatic farming module 100.

Figure 7:
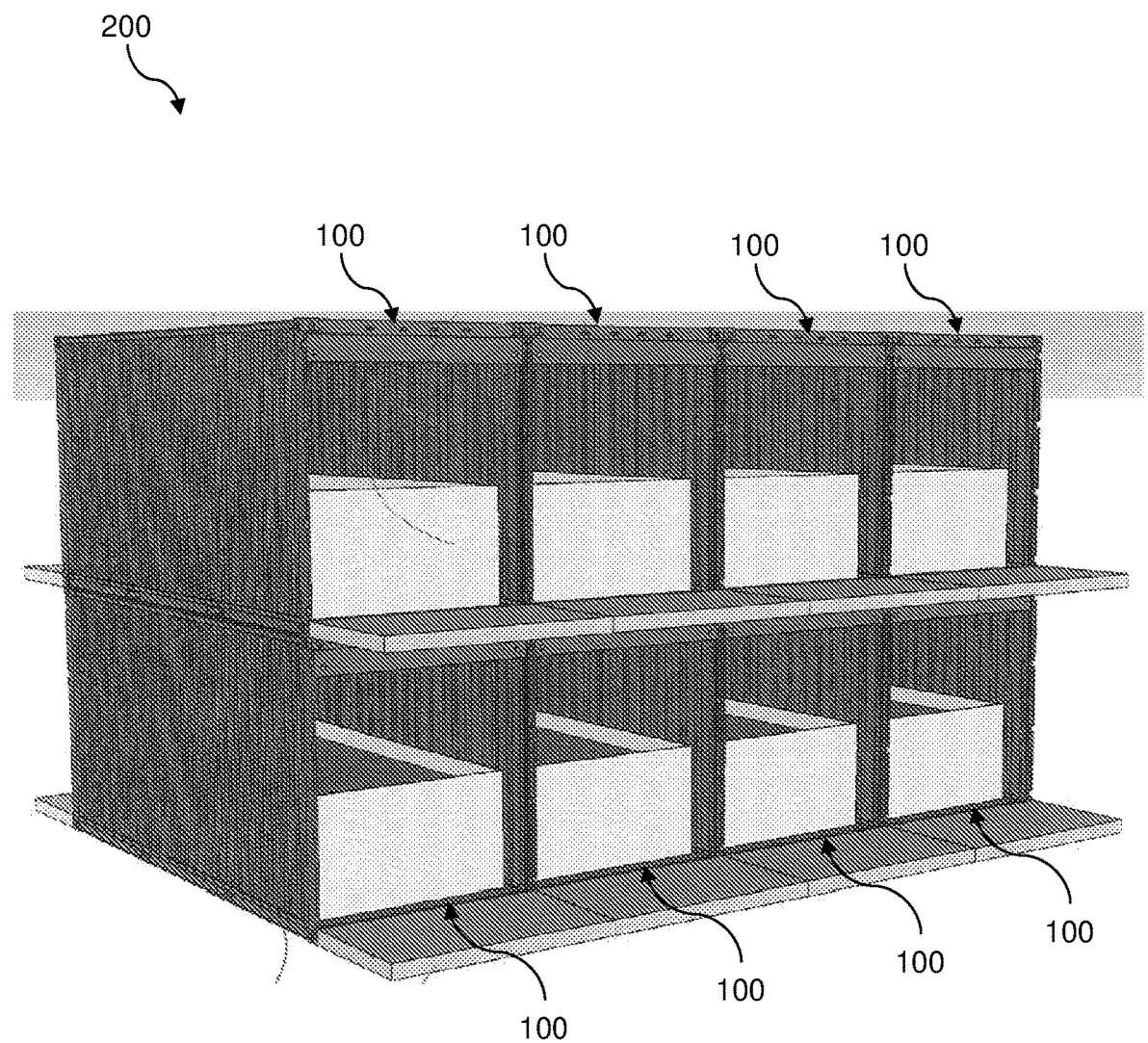
FIG. 7 is an illustration of a perspective view of an aquatic farming system, in accordance with various embodiments of the present invention.

In various representative or exemplary embodiments of the present invention with reference to FIG. 7, there is an aquatic farming system 200 comprising a set of aquatic farming modules or units 100 arranged in one or more stacked levels. Each stacked level comprises an array of one or more aquatic farming modules 100. An array comprises one or more rows and one or more columns of aquatic farming modules 100 to form a single stacked level. Each row of aquatic farming modules 100 extends along the widths thereof when the aquatic farming modules 100 are placed side-by-side. Each column of aquatic farming modules 100 extends along the lengths thereof when the aquatic farming modules 100 are placed end-to-end. Notably, a single stacked level with an array of one row and one column is equivalent to a single aquatic farming module 100. The aquatic farming system 200 illustrated in FIG. 7 comprises eight aquatic farming modules 100 arranged in two stacked levels, each stacked level comprising an array of one row and four columns of the aquatic farming modules 100. The aquatic farming modules 100 may be arranged by known containerization methods used in intermodal freight transport.

Each aquatic farming module 100 in the aquatic farming system 200 comprises access doors 130 for selectively opening/closing the end entrances 106 of the respective intermodal container 102. For each stacked level of aquatic farming modules 100, selective opening/closing of the end entrances 106 of the intermodal containers 102 in said stacked level facilitates user accessibility to the housing structures 110 in said stacked level for farming the aquatic organisms.

In some embodiments as shown in FIG. 7, the end entrances 106 of the intermodal containers 102 in both stacked levels are opened. As the intermodal containers 102 are placed side-by-side, the open end entrances 106 allow users, such as working personnel, to traverse across the intermodal containers 102 in one stacked level, thereby allowing the users to access the housing structures 110 in the same stacked level. Furthermore, if a stacked level has two or more rows of aquatic farming modules 100, the open end entrances 106 allow users to traverse through the intermodal containers 102 which are positioned end-to-end in different rows. In contrast, conventional intermodal containers have hinged doors, which when opened, hinder user accessibility to the adjacent container. Specifically, the hinged doors in the open state obstruct users who want to access the adjacent container. Moreover, the hinged doors prevent the containers from being positioned end-to-end. Advantageously, the access doors 130 enable selectively opening/closing of the end entrances 106 and planar actuation of the access doors 130 does not hinder or obstruct users from accessing the intermodal containers 102 in the same stacked level.

Optionally, the aquatic farming modules 100 comprise external access platforms 132. The external access platforms 132 improve user accessibility to the housing structures 110 in a stacked level, as users can walk on the external access platforms 132 and enter the intermodal containers 102 in the same stacked level.

In one embodiment, each aquatic farming module 100 comprises one external access platform 132 integrally formed with or permanently attached to the housing structure 110 or the intermodal container 102 at one end entrance 106. Each aquatic farming module 100 thus has platformed and non-platformed end entrances 106. The aquatic farming modules 100 may be positioned end-to-end in two rows of the array such that the non-platformed end entrances 106 are facing each other. This minimizes the space between the aquatic farming modules 100 and allows users to easily walk across. Alternatively, the aquatic farming modules 100 may be positioned end-to-end in two rows of the array such that non-platformed entrances 106 face platformed entrances 106, allowing for more space between the aquatic farming modules 100.

In one embodiment, each aquatic farming module 100 comprises two external access platforms 132 integrally formed with or permanently attached to the housing structure 110 or the intermodal container 102 at both end entrances 106. The aquatic farming modules 100 may be positioned end-to-end in two rows of the array such that the platformed end entrances 106 are facing each other. Alternatively, the aquatic farming modules 100 may be positioned in a single row of the array.

In one embodiment, each aquatic farming module 100 comprises one or more external access platforms 132 attached to the housing structure 110/intermodal container 102 by hinge components such that the external access platforms 132 are rotatable about lateral hinge axes. The external access platforms 132 may be released via the lateral hinge axes as desired to allow access into the intermodal container 102.

In one embodiment, each aquatic farming module 100 comprises one or more external access platforms 132 coupleable to bottom portions of the end entrances 106 of the intermodal container 102. The external access platforms 132 are stored in the intermodal container 102 and coupled to the end entrances 106 as desired to allow access into the intermodal container 102.

Figure 8:
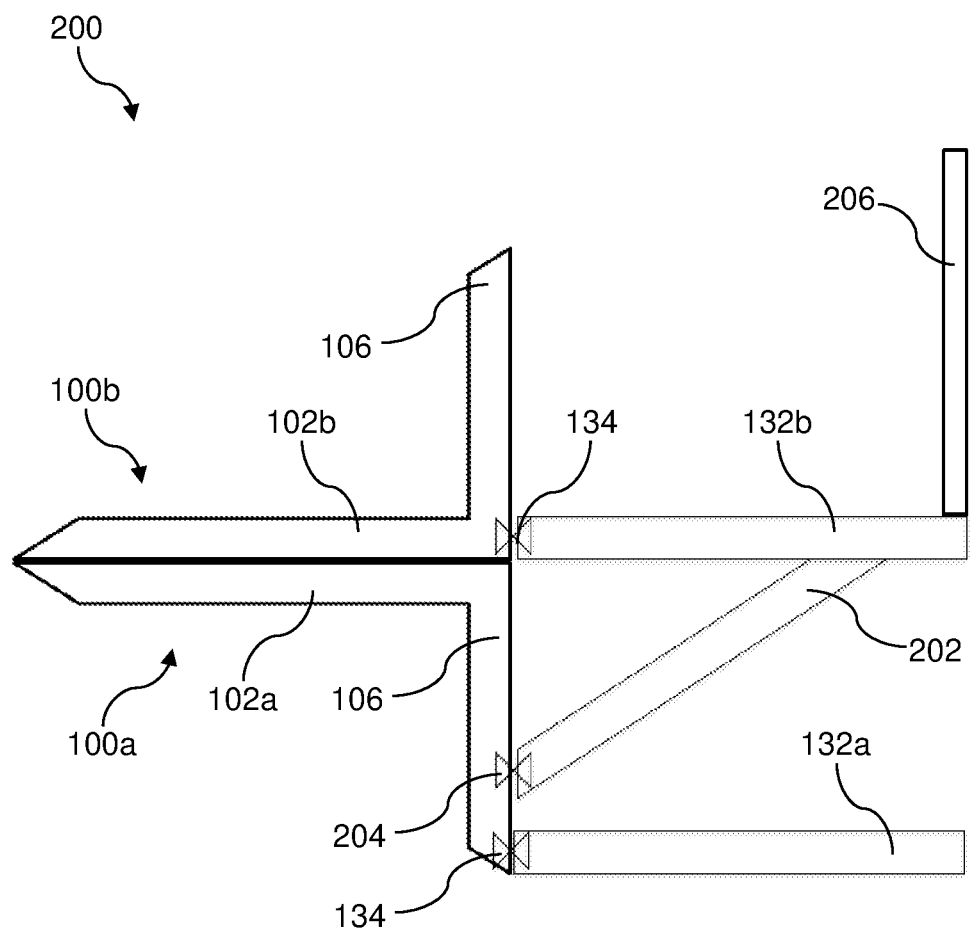
FIG. 8 is an illustration of a lateral view of another aquatic farming system, in accordance with various embodiments of the present invention.

In one embodiment as shown in FIG. 8, the aquatic farming system 200 comprises two aquatic farming modules 100—a lower aquatic farming module 100a and an upper aquatic farming module 100b stacked on top. The lower aquatic farming module 100a and upper aquatic farming module 100b comprise a lower intermodal container 102a and upper intermodal container 102b, respectively. The lower aquatic farming module 100a comprises a lower external access platform 132a coupled to the bottom portion of the lower intermodal container 102a. The upper aquatic farming module 100b comprises an upper external access platform 132b coupled to the bottom portion of the upper intermodal container 102b. Each of the lower and upper external access platforms 132a and 132b comprises a coupling mechanism 134, such as removable locking pins, for coupling to the lower and upper intermodal containers 102*a* and 102*b*, respectively. The aquatic farming system 200 additionally comprises a set of support braces 202 coupling the upper external access platform 132*b* to the lower intermodal container 102*a*. The support braces 202 may be positioned towards both side walls 104. The support braces 202 comprise a coupling mechanism 204, such as removable locking pins, for coupling to the vertical side beams of the lower intermodal container 102*a*. The support braces 202 support the upper external access platform 132*b* and reduces its cantilever effect. The lower external access platform 132*a* is supported by the ground. The aquatic farming system 200 additionally comprises a safety rail 206 coupled to an external edge of the upper external access platform 132*b*. The safety rail 206 mitigates risk of a user falling from the upper external access platform 132*b*. The safety rail 206 may have a minimum height to comply with safety regulations. For example, the safety rail 206 has an approximate height of 1.1 meters. The external access platforms 132*a* and 132*b*, support braces 202, and safety rail 206 are removable, by decoupling the respective coupling mechanisms, and are stored in the intermodal containers 102 when the aquatic farming modules 100 are not in use, such as during transportation of the aquatic farming modules 100.

More optionally, the aquatic farming modules 100 comprise external access ladders coupleable to the edges of the external access platforms 132. The external access ladders facilitate user accessibility between stacked levels. For example, users may use the external access ladders to go between the lower stacked level and upper stacked level. The external access ladders, together with the access doors 130 and external access platforms 132, advantageously facilitate user accessibility into the intermodal containers 102 and to the housing structures 110 in all stacked levels for farming the aquatic organisms in all the aquatic farming modules 100 of the aquatic farming system 200.

In some embodiments, the aquatic farming system 200 further comprises a set of external systems connectable to the housing structures 110 via the end entrances 106 of the intermodal containers 102. The aquatic farming system 200 may comprise a set of external modules or units for housing the external systems. Each external module may comprise an intermodal container such that the external modules can be arranged together with the aquatic farming modules 100 in the arrays and stacked levels to form an integrated aquatic farming system 200. The external systems may comprise a water recycling system for supplying water to the aquatic farming modules 100, such as to replenish water loss from the RAS, and for removing waste water from the aquatic farming modules 100. The external systems may comprise a waste recycling system for recycling organic waste matter from the aquatic farming modules 100. The organic waste matter may be recycled and repurposed into fertilizers. The external systems may comprise a hydroponics system for growing and farming plants, e.g. vegetables, for food production. Fertilizers repurposed from the organic waste matter may be reused in the hydroponics system. Accordingly, the aquatic farming system 200 may operate as an integrated aquaponics and hydroponics food production system.

As described in various embodiments herein, the aquatic farming system 200 comprises a set of aquatic farming modules or units 100, each of which is self-reliant and can function on its own to grow and farm aquatic organisms to produce food for consumption by people. The aquatic farming system 100 may comprise a single or standalone aquatic farming module 100. The aquatic farming system 100 may alternatively comprise multiple aquatic farming modules 100 that can be arranged together in arrays and stacked levels, similar to containerizations in intermodal freight transport.

Due to the modular configuration of the aquatic farming system 200, each aquatic farming module 100 can be easily replaced, such as after prolonged usage and/or wear and tear, especially if the intermodal container 102 is severely corroded/rusted. Moreover, the aquatic farming system 200 can be disassembled and reassembled, allowing it to be relocated elsewhere as desired. Each aquatic farming module 100 comprises an intermodal container 102 which is of a standard size, allowing the aquatic farming module 100 to be transported using known means of transporting ISO or shipping containers.

The aquatic farming system 200 with multiple aquatic farming modules 100 provides greater capacity to grow, farm, and harvest large amounts of aquatic organisms, thereby increasing food production for people. As the aquatic farming modules 100 can be vertically stacked, the aquatic farming system 200 can be located on a small land area, improving efficient use of available land areas. This is particularly advantageous to countries where available land areas are scarce. The aquatic farming system 200 is thus suitable for use in urban cities or underutilized urban spaces. Urban cities tend to have lower carbon footprint as there is fewer industrial facilities, such as factories and power plants, which are commonly located further away from the populated cities. Using the aquatic farming system 200 in urban cities improves the freshness of the farmed aquatic organisms as they can be grown with minimal industrial pollution. There is also more control over the aquatic farming and the quantity/quality of aquatic organisms as compared to traditionally farming like in ponds and sea cages. The aquatic farming system 200 can also be used on freight transport, such as ships and barges, out at sea where there is even less pollution, further ensuring the freshness and quality of the farmed aquatic organisms.

In the foregoing detailed description, embodiments of the present invention in relation to an aquatic farming system are described with reference to the provided figures. The description of the various embodiments herein is not intended to call out or be limited only to specific or particular representations of the present invention, but merely to illustrate non-limiting examples of the present invention. The present invention serves to address at least one of the mentioned problems and issues associated with the prior art. Although only some embodiments of the present invention are disclosed herein, it will be apparent to a person having ordinary skill in the art in view of this invention that a variety of changes and/or modifications can be made to the disclosed embodiments without departing from the scope of the present invention. Therefore, the scope of the invention as well as the scope of the following claims is not limited to embodiments described herein.

The invention claimed is:

1. A containerized aquatic farming system comprising:
a set of aquatic farming modules arranged in one or more stacked levels, each stacked level comprising an array of one or more aquatic farming modules, each aquatic farming module comprising:
an intermodal shipping container comprising a pair of opposing side walls and a pair of opposing end entrances;
a housing structure disposed in the intermodal shipping container and extending between the side walls thereof, the housing structure comprising:

a first compartment for storing water and aquatic organisms;

a second compartment adjacent to the first compartment for installing a set of water treatment mechanisms to treat the water in the first compartment;

a set of access doors disposed at one or both end entrances of the intermodal shipping container for user accessibility into the intermodal shipping container, the access doors actuatable planarly for selectively opening/closing the respective end entrances, and one or more external access platforms integrally formed with or permanently attached to the housing structure or intermodal shipping container, wherein each external access platform is attached to the housing structure or intermodal shipping container by a hinge component such that the external access platform is rotatable about a lateral hinge axis;

wherein for each stacked level of aquatic farming modules, selective opening/closing of the end entrances of the intermodal shipping containers in said stacked level facilitates user accessibility to the housing structures in said stacked level for farming the aquatic organisms.

2. The containerized aquatic farming system according to claim 1, each access door comprising a roller shutter coupled to an upper portion of the respective end entrance, the roller shutter actuatable vertically at the respective end entrance.

3. The containerized aquatic farming system according to claim 1, wherein the one or more external access platforms are coupleable to bottom portions of the end entrances of the intermodal shipping container.

4. The containerized aquatic farming system according to claim 1, each housing structure further comprising multiple structural elements forming the first and second compartments.

5. The containerized aquatic farming system according to claim 4, the structural elements in each housing structure comprising:

a first longitudinal panel adjacent to one side wall of the intermodal shipping container and bounding the first compartment; and a second longitudinal panel adjacent to the other side wall of the intermodal shipping container and bounding the second compartment.

6. The containerized aquatic farming system according to claim 5, the structural elements in each housing structure further comprising a third longitudinal panel interposing the first and second longitudinal panels to separate the first and second compartments.

7. The containerized aquatic farming system according to claim 4, the structural elements in each housing structure comprising one or more first partition panels dividing the first compartment into a plurality of first sub-compartments for storing a plurality of groups of aquatic organisms.

8. The containerized aquatic farming system according to claim 7, wherein the first partition panels are removably installed in the first compartment for selectively dividing the first compartment into the first sub-compartments.

9. The containerized aquatic farming system according to claim 4, the structural elements in each housing structure comprising one or more second partition panels dividing the second compartment into a plurality of second sub-compartments for installing the water treatment mechanisms.

10. The containerized aquatic farming system according to claim 9, each second partition panel comprising an opening for connecting the water treatment mechanisms to one another.

11. The containerized aquatic farming system according to claim 4, the structural elements in each housing structure comprising a platform panel disposed on the second compartment to facilitate user accessibility through the intermodal shipping container.

12. The containerized aquatic farming system according to claim 4, wherein the structural elements in each housing structure are welded to one another.

13. The containerized aquatic farming system according to claim 4, wherein the structural elements in each housing structure comprise a polyethylene or polypropylene material.

14. The containerized aquatic farming system according to claim 1, each aquatic farming module further comprising a protective layer lining interior surfaces of the intermodal shipping container, the protective layer comprising a corrosion-resistant material.

15. The containerized aquatic farming system according to claim 14, wherein the corrosion-resistant material is epoxy or polyurethane.

16. The containerized aquatic farming system according to claim 1, further comprising a set of external systems connectable to the housing structures via the end entrances of the intermodal shipping containers.

17. The containerized aquatic farming system according to claim 16, further comprising a set of external modules arranged with the aquatic farming modules for housing the external systems.

18. The containerized aquatic farming system according to claim 16, wherein the external systems comprise a water recycling system and/or waste recycling system.

\* \* \* \* \*